United States Patent Office 2,854,782
Patented Oct. 7, 1958

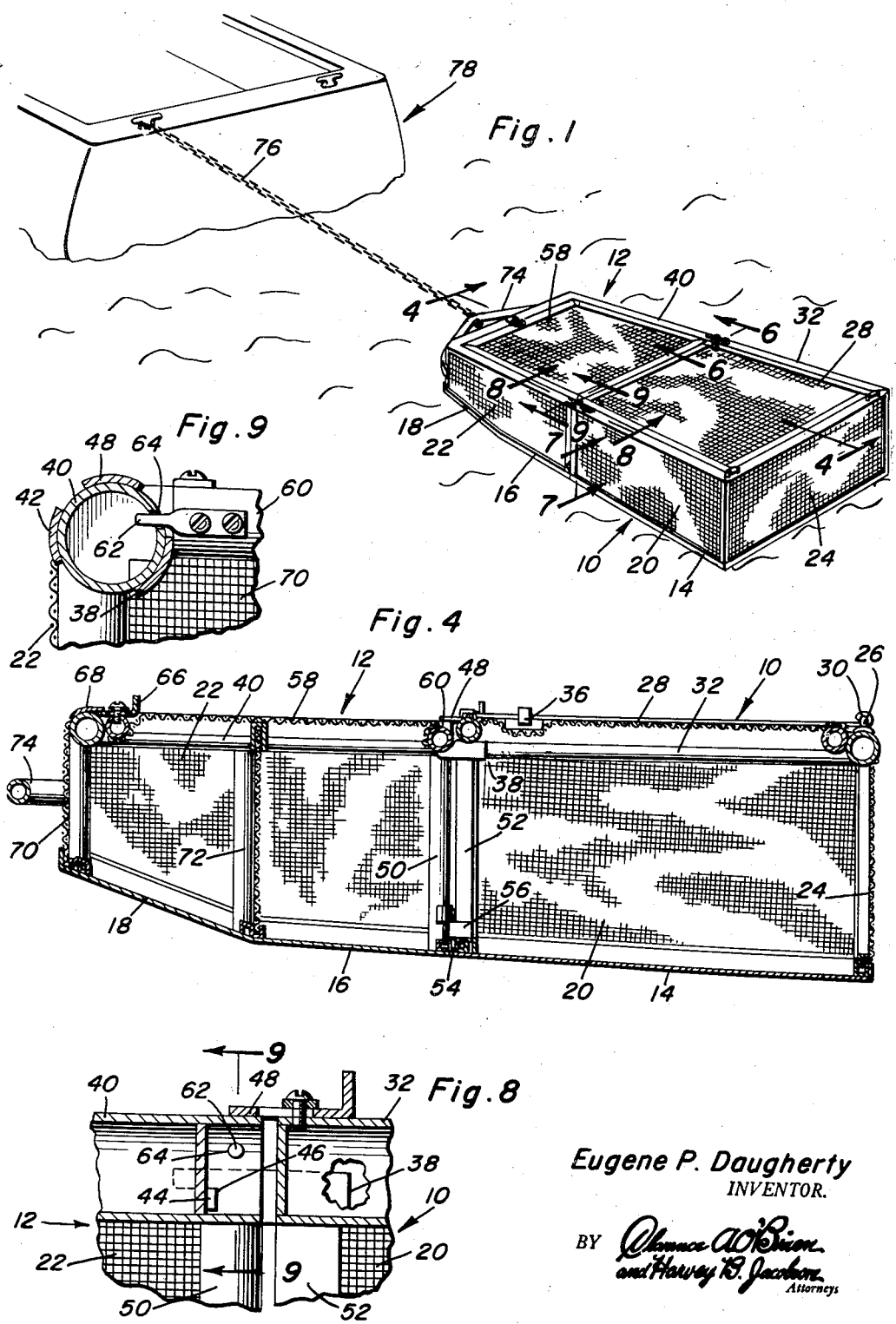

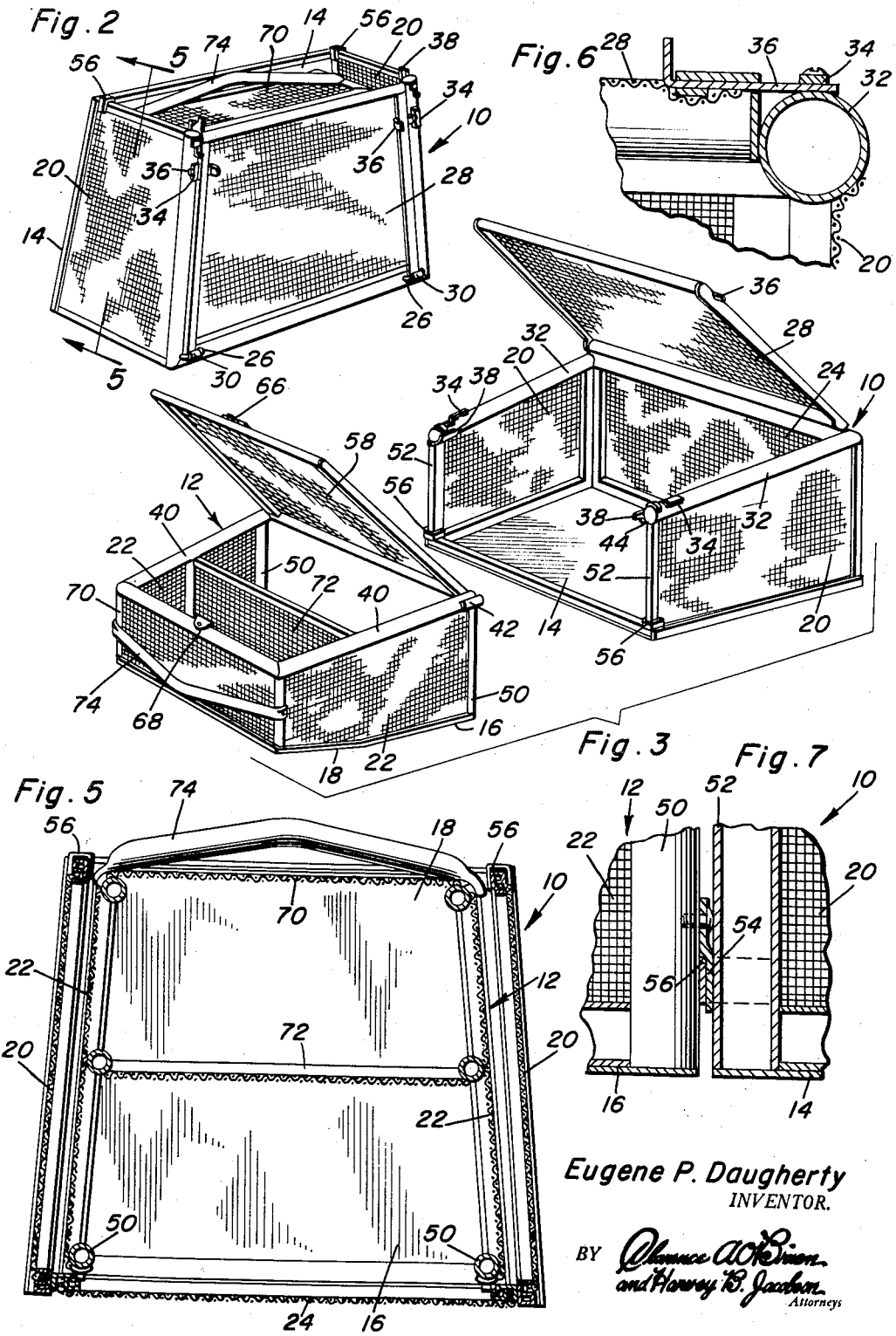

2,854,782

KNOCKDOWN LIVE FISH CONTAINER

Eugene P. Daugherty, Bedford, Ind.

Application October 2, 1956, Serial No. 613,491

3 Claims. (Cl. 43—55)

This invention relates to an improved portable container for live bait and fish commonly referred to as a live box, and has reference in particular to a box which is built to resemble a small boat and is such in construction that it floats atop a body of water and may, therefore, be towed behind a larger boat and moved from place to place while fishing.

As implied in the preceding general statement, boat-like live boxes are not new. For an example, reference may be had to the Spotswoods Patent 2,657,496.

An object of the present invention is to structurally and otherwise improve upon Spotswood and similarly constructed and performing live bait and fish storing and handling containers. To this end, the invention herein disclosed features a sectional knockdown box wherein the sections have imperforate bottoms and screened body portions, each section having suitably fastened openable and closable covers.

Another object of the invention is to provide a novel boat-like sectional live box having an imperforate broad surface bottom with an upwardly inclined forward end portion and a substantially flat rearward portion, said box also comprising a forward section and a rearward section each having screen walls, adjacent end portions of said sections abutting each other, being open and communicating, and having means whereby they may be cooperatively but separably joined with each other, and each section having an openable and closable cover.

The invention features companion fore and aft sections which are rectangular and gradually narrowed in width to the extent that the over-all box resembles a small row boat, said aft section being interiorly large enough to permit the smaller fore section to be nested and stored completely therein, the closed front wall thereof registering with the open front of the aft section and being exposed and equipped with a fixed carrying handle, whereby the cover of the aft section may be opened, the covered fore section nested and stored, after which the last named cover may be closed and fastened in a manner to allow the thus nested sections to be handled and carried by said handle.

Other objects, features and advantages will become more readily apparent from the following description of the details, drawings and claims.

In the drawings:

Fig. 1 is a perspective view showing the improved live box and how it is constructed and used;

Fig. 2 is a perspective view showing the sections telescoped or nested for compactness and convenience and ease of carrying;

Fig. 3 is an exploded perspective view showing the covers swung open;

Fig. 4 is a central longitudinal sectional view taken approximately on the plane of the line 4—4 of Fig. 1;

Fig. 5 is a section on an enlarged scale taken on the vertical line 5—5 of Fig. 2;

Fig. 6 is an exaggerated fragmentary sectional view taken approximately on the plane of the line 6—6 of Fig. 1;

Figs. 7, 8 and 9 are similar views taken on the line 7—7, 8—8 and 9—9 of Fig. 1, respectively.

Referring now to the drawings the rear or aft section is denoted by the numeral 10 and the forward or fore section is denoted by the numeral 12. When fastened together the two sections provide a buoyant live box shown and used in the manner seen in Fig. 1 and, alternatively, in the nested arrangement seen in Fig. 2. Generally speaking, the complete live box has a broad imperforate bottom with an upwardly inclined front end, screened front, rear, side and top walls, the top wall being openable and closable to provide covers. As shown in Fig. 3 the imperforate aluminum or sheet material bottom 14 is utilized in the rear section 10 and a similar bottom 16 in the section 12 with the forward portion gradually narrowed in width and upwardly inclined as at 18. The screened side walls of section 10 are denoted by the numeral 20 and the screened side walls of the fore section are denoted by the numeral 22. The rear screen wall 24 of the section 10 is provided with brackets 26 to which the screened top wall 28 hingedly connects as at 30. It will be noticed in this connection that the forward end of the rearward section is open. All of the walls are suitably framed wire mesh or equivalent screen and the details of these parts are not to be stressed. It will be noted that the top frame members 32 (Fig. 3) are provided with keepers 34 for suitably constructed slidably mounted latches 36 (Fig. 6) which serve to retain the cover in its closed position. The forward ends of the frame members are also provided on the inner sides with extending cleats 38 which, when the sections are assembled slidingly and detachably, abut the rear end portions of the top frame members 40 of the fore section 12. The rear ends of these same members are provided with similar cleats 42 on their outer sides which embrace the forward ends of the frame members 32, as is evident from Fig. 4.

Also, as will be seen in Fig. 8 the cleats 38 have lateral detents 44 which fit removably in keeper holes 46 provided therefor. In addition, sliding catches 48 of suitable construction are provided to assist in stabilizing the connection between the vertical frame members 50 and 52. The lower end of each frame member 50 (see Fig. 4) is provided with a keeper finger 54 which fits releasably in a U-shaped retainer or keeper 56 provided therefor so that when the forward open end of the rear section and the rearward open end of the fore section are assembled they are in communicative alignment with the respective sections releasably and rigidly connected together. It is repeated here that the particular devices or elements employed to bring about this rigid separable and operable relationship between the sections may vary in practice.

The top wall or screen 58 of the section 12 has its rear frame member 60 (Fig. 9) provided with outstanding hinging and connecting members 62 which are hinged in holes provided therefor as at 64. A suitable sliding latch or catch 66 on the forward end of the cover is cooperable with a keeper bracket 68 on the top frame member of the front wall 70 (Figs. 3 and 4) whereby to provide satisfactory holddown means for this cover 58. There is also a screened partition 72 provided in the fore section which divides the forward portion into a live bait container. The remainder of the container is used for receiving, storing and transporting live fish. It will be noted too that a suitable bail-like handle 74 is provided on the leading end of the section 12. This is fixed centrally in place and is generally V-shaped so that it facilitates carrying of the device in the manner seen in Fig. 2 and also provides means for attaching a tow chain 76 thereto which, in turn is fastened at its front end to a row boat or the like 78 permitting the live box to be towed behind a boat and shifted from place to place.

The sections are gradually tapered in width from the rear toward the forward portion and the rear section is sufficiently large interiorly considered to allow the forward section 12 to be telescoped and nested therein in an obvious manner. That is to say, by opening the cover 28 the then closed section 12 may be fitted in place. This brings the closed end wall 70 in alignment with the open forward end of the section 10, whereby to expose the handle for carrying purposes. When the cover 28 is latched down and held by the fasteners or sliding latches 36 (Fig. 6) the two sections are ready to be conveniently picked up and carried, as an entity, by hand.

It is believed that a live box constructed in accordance with the principles of the instant invention and as herein revealed constitutes a simple, practical and efficient structure capable of fulfilling the expected needs of fishermen.

Minor changes in shape, size, materials and rearrangement of parts may be resorted to in actual practice without departing from the spirit of the invention or the scope of the invention as claimed.

What is claimed as new is as follows:

1. A floatable container for live bait and fish comprising an elongated live bait box buoyant and adapted to float and travel on water so that it may be towed behind a boat, said box having a broad bottom with an upwardly inclined front end, said bottom being commensurate in length with the overall length of said box and being wholly imperforate, screened front, rear, side and top walls, at least one half-portion of said top wall being hingedly mounted and openable and closable, a partition mounted in the forward portion of said box and dividing it into separate compartments, one compartment for live bait and the other compartment for fish, said box being in general resemblance of a miniature row boat, portable, and embodying readily separable and connectible sections; namely, a fore section and a coplanar aft section, adjacent ends of said sections being unobstructedly open, abutting each other in end-to-end cooperable and communicable box-forming alignment, means detachably connecting said sections with each other, said aft section being larger than the fore section, whereby said fore section may be bodily detached from the aft section and nested within the confines of the aft section and to thus provide a compact easy-to-carry container.

2. A portable knockdown container which can be carried by hand and which is sufficiently buoyant that it is capable of floating on water comprising an elongated live bait box having a wholly imperforate broad surface bottom with an upwardly inclined forward end portion and a substantially flat rearward portion, said box also comprising a forward section and a rearward section each section having screened walls, adjacent end portions of said sections abutting each other, being entirely and unobstructedly open and communicating, means whereby said sections may be cooperatively but separably joined with each other, the entire top wall of each section being hingedly mounted and openable and closable, the rearward section being larger than the forward section so that said sections may be separated and nested one within the other to provide a compact easy-to-carry container, the screened front wall of said forward section serving as a closure for both sections when they are nested and having an exposed easily accessible common carrying handle for the over-all container.

3. A portable knockdown container buoyant enough to float on water and small enough to be conveniently transported and also easily picked up and carried by a user thereof comprising a sectional live bait box embodying fore and aft sections, each having top, bottom, side and end walls, said bottom walls being imperforate and the remaining walls each comprising a marginally framed flat screen, adjacent ends of the sections being unobstructedly open and separably aligned, in an abutting freely communicable relation, means detachably connecting said sections with each other, the entire top wall of each section being hingedly mounted and serving as an openable and closable cover, said sections being gradually tapered in width from the rear to the front to the extent that the over-all box resembles a small row boat, said forwardly narrowed aft section being interiorly large enough and properly proportioned to permit the smaller fore section to be nested and stored completely therein, the closed front wall of said fore section registering with the open front of the aft section and being exposed and equipped with an accessible fixed carrying handle, whereby the cover of the aft section may be opened to uncover the aft section, the closed fore section nested and stored therein, after which the cover of the aft section may be closed and fastened in a manner to keep the sections together and to allow the thus nested sections to be handled and carried by said handle.

References Cited in the file of this patent

UNITED STATES PATENTS

| | | |
|---|---|---|
| 1,412,912 | Bain | Apr. 18, 1922 |
| 1,619,634 | Roat | Mar. 1, 1927 |
| 1,731,191 | De Roy | Oct. 8, 1929 |
| 2,493,203 | Madeksho | Jan. 3, 1950 |
| 2,657,496 | Spotswood | Nov. 3, 1953 |
| 2,666,933 | Engensperger | Jan. 26, 1954 |